United States Patent
Ryu et al.

(10) Patent No.: US 9,421,852 B2
(45) Date of Patent: Aug. 23, 2016

(54) DUST SEALING APPARATUS FOR WRAP DOOR GARNISH OF A VEHICLE

(71) Applicants: Hyundai Motor Company, Seoul (KR); Kia Motors Corporation, Seoul (KR)

(72) Inventors: Seong Hwan Ryu, Whasung-Si (KR); Kwang Jae Choi, Whasung-Si (KR); Jeong Ho Lee, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/534,652

(22) Filed: Nov. 6, 2014

(65) Prior Publication Data
US 2015/0231954 A1 Aug. 20, 2015

(30) Foreign Application Priority Data
Feb. 20, 2014 (KR) .................. 10-2014-0019393

(51) Int. Cl.
*B60J 10/84* (2016.01)
*B60J 10/08* (2006.01)
*B60R 13/04* (2006.01)

(52) U.S. Cl.
CPC ............. *B60J 10/085* (2013.01); *B60R 13/043* (2013.01)

(58) Field of Classification Search
CPC ......... B60J 10/081; B60J 10/085; E06B 1/70; E06B 7/16

USPC .................. 49/502; 296/151, 154, 146.9, 198
See application file for complete search history.

(56) References Cited

U.S. PATENT DOCUMENTS

| | | | | |
|---|---|---|---|---|
| 5,050,351 A | * | 9/1991 | Goldbach et al. | ............... 49/502 |
| 6,138,415 A | * | 10/2000 | Ohtsu et al. | .................. 49/490.1 |
| 6,810,624 B2 | * | 11/2004 | Fujimura et al. | ............. 49/479.1 |
| 2009/0167010 A1 | * | 7/2009 | Rompage et al. | ............. 280/847 |
| 2010/0038931 A1 | * | 2/2010 | Ihashi et al. | .................. 296/209 |
| 2011/0012388 A1 | * | 1/2011 | Iida et al. | .................... 296/146.9 |
| 2011/0115253 A1 | * | 5/2011 | Kishi et al. | ..................... 296/151 |

FOREIGN PATENT DOCUMENTS

| | | | |
|---|---|---|---|
| JP | 11-301369 A | | 11/1999 |
| JP | 2000-289465 A | | 10/2000 |
| JP | 2006-205984 A | | 8/2006 |
| JP | 2006-264370 | * | 10/2006 |
| JP | 2009-12490 A | | 1/2009 |
| KR | 20-1998-039602 U | | 9/1998 |
| KR | 1998-039602 U | | 9/1998 |
| KR | 10-2002-0081969 A | | 10/2002 |
| KR | 10-2008-0040087 A | | 5/2008 |

* cited by examiner

*Primary Examiner* — Gregory Strimbu
(74) *Attorney, Agent, or Firm* — Morgan, Lewis & Bockius LLP

(57) ABSTRACT

A dust sealing apparatus for a door garnish of a vehicle may include a dust sealing member contacting a side door sill when a rear door is closed, and the dust sealing member may be attached to an inner surface of the garnish of the rear door adjacent to a rear wheel arch, in which the dust sealing member includes a sealing part configured to prevent permeation of contaminants.

6 Claims, 4 Drawing Sheets

DUST SEALING APPARATUS FOR WRAP DOOR GARNISH OF A VEHICLE

CROSS-REFERENCE TO RELATED APPLICATION

The present application claims priority to Korean Patent Application No. 10-2014-0019393 filed on Feb. 20, 2014 Month Day, Year, the entire contents of which is incorporated herein for all purposes by this reference.

BACKGROUND OF THE INVENTION

1. Field of the Invention

The present disclosure relates to a dust sealing apparatus for a wrap door garnish of a vehicle. More particularly, it relates to a dust sealing apparatus for a wrap door garnish of a vehicle which may prevent a contamination phenomenon at an inner side portion and a side door sill portion of a wrap door in such a way that a sealing member with a closed cross surface is secured to an inner surface of a wrap door garnish of a vehicle.

2. Description of Related Art

The vehicle body portions adjacent to the lower sides of both a front door and a rear door of a vehicle are called a side door sill. The left and right width of the side door sill (the stepping width when a passenger gets in or out of a vehicle) is generally determined based on the specification of the doors.

Referring to FIG. 1, in case of the ordinary door, when the door is closed, the lower side of the door 10 is adjacent to the upper side of the side door sill 20, so the left and right width of the side door sill 20 is larger to meet the thickness of the door.

Referring to FIG. 1, reference number 12 represents a garnish which is a type of decoration member provided in a lower side of the door 10 in consideration of esthetic quality, and reference number 22 represents a side door sill molding provided in an outer surface of a side door sill 20 in consideration of esthetic quality.

In case of the ordinary door, since the left and right width of the side door sill is made larger, a passenger (in particular, a woman or a short person) may need to step farther away from the door frame which causes inconvenience when getting in or out of a vehicle. In particular, when a predetermined contaminant (dust, soil, etc.) is stuck on an upper surface of a side door sill, such a contaminant may stain the passenger's pants while the passenger gets in or out of the vehicle, which may lead to complaints from vehicle customers.

In order to improve the above described problems, there is disclosed a wrap door which is configured to improve a passenger's convenience when the passenger gets in or out a vehicle in such a way to reduce the left and right width of the side door sill.

Referring to FIG. 2, the wrap door represents a door which is configured to invisibly wrap the whole portion of the outer surface of the side door sill, for which the garnish 12 secured to the lower side of the door 10 requires the increased length in the up and down directions and is configured to bulge outward, thus looking a little bulky.

More specifically, the garnish 12 becomes as bulky as the reduced left and right width of the side door sill 20, thus covering the whole portion of the outer surface of the side door sill.

Therefore, since the garnish adapts such a bulky structure, it is possible to enhance a design freedom wherein a side door sill may have a visually bulky look. Particularly, since the left and right width of the side door sill is reduced, the passenger may feel easier when getting in or out of the vehicle.

However, when the vehicle runs along an unpaved road when it rains, contaminants such as muddy water, dust, etc., may permeate through gaps between the garnish and the side door sill, so the lower portions of the inner surface of the door and the surfaces of the side door sill may be contaminated with contaminants.

Specifically, onto the lower sides of the rear door adjacent to the rear wheel arch, muddy water may splash a lot due to the aid of a centrifugal force generated by the rotations of the tires, so the pollution level of the contaminants further increases at the portions between the garnish of the rear door and the side door sill as compared to other portions.

According to a related method designed to improve the above-described problems, referring to FIG. 3, there is disclosed a structure wherein a sealing member 60 configured like a cantilever and shaped like a lip is attached to an inner surface of the garnish 12 of the rear door 10, thus preventing the inputs of the contaminants through a portion between the garnish of the rear door and the side door sill.

However, the lip-shaped sealing member is simply like a cantilever, so the lip-shaped sealing member repeatedly comes into contact with the side door sill as the door is repeatedly opened and closed, so the strength of the lip-shaped sealing member gradually becomes weak, and the lip-shaped sealing member may be transformed, i.e., it may be easily bent by even small force or it may be rolled up in one direction, and the contacting force with the side door sill may decrease. Consequently, despite the presence of the lip-shaped sealing member, contaminants may easily permeate inside the vehicle through the gaps between the garnish of the rear door and the side door sill.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a dust sealing apparatus for a wrap door garnish of a vehicle which may maintain a predetermined strength despite repeated contacts with a side door sill as a door is repeatedly opened and closed, and thus fully prevent the permeation of contaminants through gaps between the garnish of the rear door and the side door sill, in such a way that a dust sealing member with a closed cross section is attached to a portion contacting with a side door sill in an inner surface of a garnish of a rear door adjacent to a rear wheel arch.

In an aspect of the present invention, a dust sealing apparatus for a wrap door garnish of a vehicle may include a dust sealing member which is attached to a portion contacting with a side door sill in an inner surface of the garnish of a rear door adjacent to a rear wheel arch, the dust sealing member including a sealing part with a closed cross section configured to prevent permeation of contaminants from an outside thereof.

The dust sealing member may further include the sealing part with a circular or elliptical closed cross section and a fixing plate which is integrally formed in a rear end terminal of the sealing part and is adhered to the inner surface of the garnish.

The apparatus may further include a reinforcing member which is engaged in the inner surface of the garnish in order to prevent the sealing part of the dust sealing member from being pushed in one direction, the reinforcing member being configured to support a boundary portion between the sealing part and the fixing plate.

The reinforcing member may include a reinforcing bracket which integrally may include a base plate closely contact-supported by the inner surface of the garnish, an inner side support terminal which is bent twice from an inner side terminal of the base plate and is configured to support a boundary portion between the sealing part and the fixing plate, and an outer side support terminal which is bent twice from an outer side terminal of the base plate, and a resting member which is integrally adhered to the inner surface of the garnish to support the outer side support terminal of the reinforcing bracket.

A support groove is formed in the boundary portion between the sealing part and the fixing plate, and the inner side support terminal is pressed and inserted in the support groove, and a resting groove is formed in an inner surface of the resting member in order for the outer side support terminal to be pressed and inserted and supported.

The present invention has the following advantageous effects through the above-described solutions.

First, despite repeated contacts with the side door sill as the door is repeatedly opened and closed, it is possible to maintain an original shape and strength without any transformation in such a way that a dust sealing member with a closed cross section is attached to a portion contacting with a side door sill in an inner surface of a garnish of a rear door adjacent to a rear wheel arch, so a close contact force against the side door sill may be increased.

Second, since the close contact force against the side door sill increases, it is possible to fully prevent the permeation of contaminants through gaps between the garnish of the rear door and the side door sill.

Third, by providing a reinforcing bracket except for a dust sealing member with a cross section which is installed in an inner surface of the garnish, it is possible to prevent any movements like a sealing part of a dust sealing member with a closed cross section pushed from a side door sill to the outside of a vehicle body when a door is closed.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
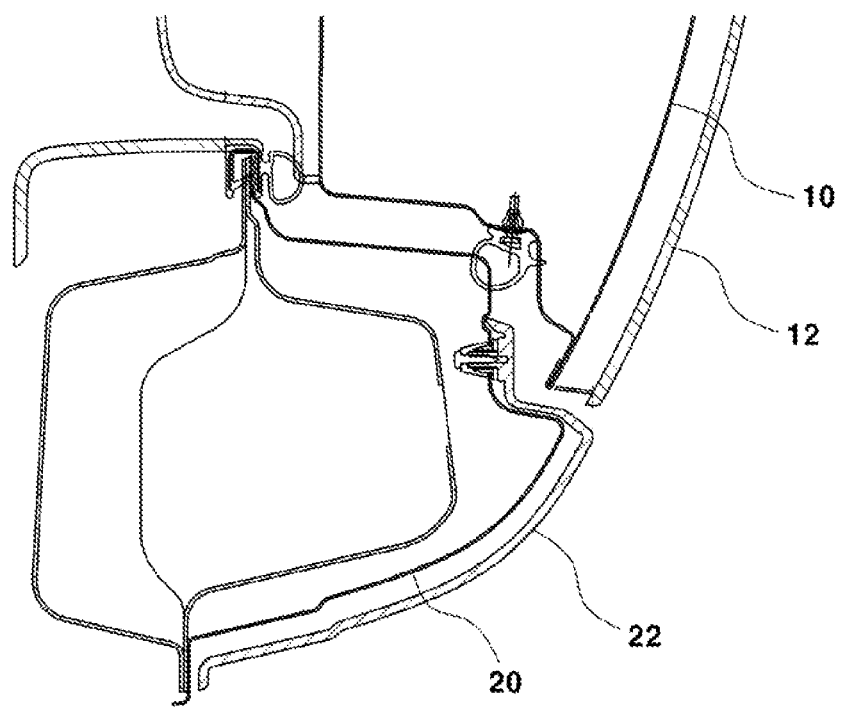
FIG. 1 is a cross sectional view illustrating a priority art door and a side door sill for a vehicle.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the preferred embodiments of the present invention will be described with reference to the accompanying drawings.

The present invention is made focusing on enhancing a dust sealing performance of a wrap door which is configured to invisibly wrap the whole portion of the outer surface of a side door sill to improve a passenger's convenience when the passenger gets in or out of a vehicle by reducing the left and right width of a side door sill.

Figure 2:
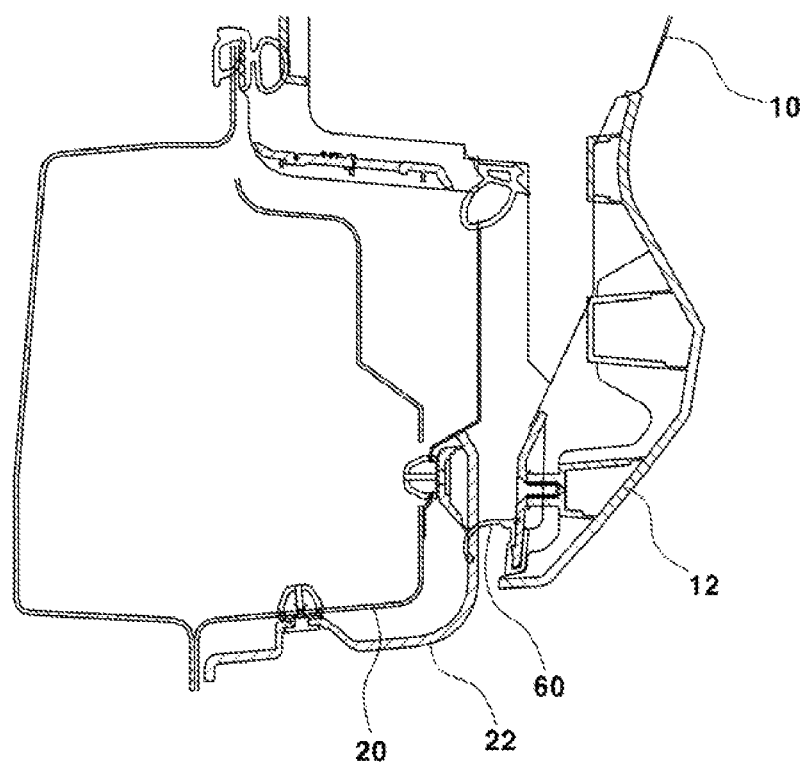
FIG. 2 is a cross sectional view illustrating a prior art wrap door and a side door sill for a vehicle.
Figure 3A:
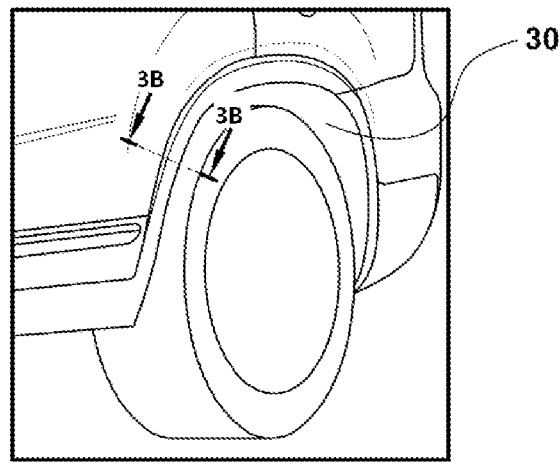
FIG. 3A is a side view illustrating a dust sealing apparatus for a door garnish in the related art.
Figure 3B:
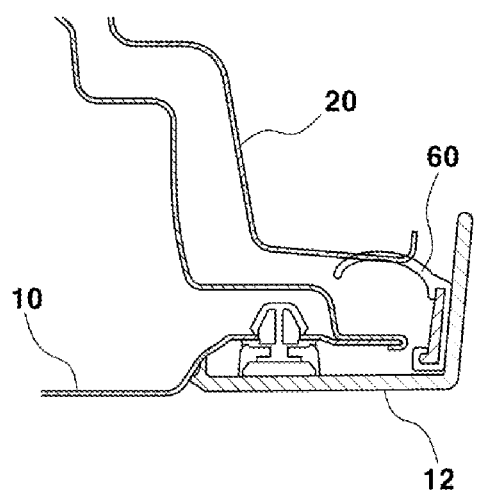
FIG. 3B is a cross sectional view along line 3B-3B of FIG. 3A.
Figure 4A:
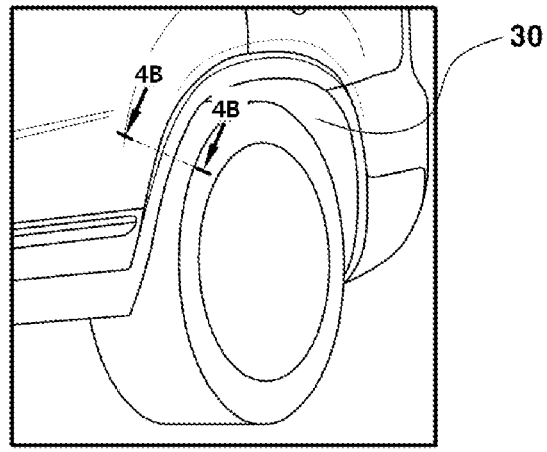
FIG. 4A is a side view illustrating a dust sealing apparatus for a door garnish of a vehicle.
Figure 4B:
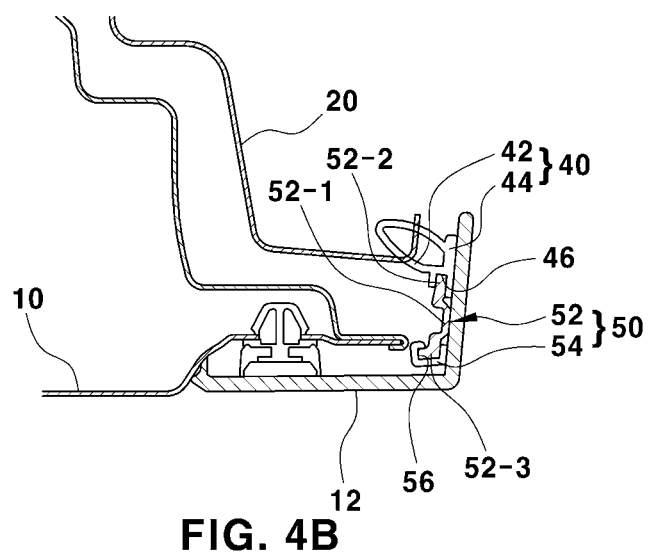
FIG. 4B is a cross sectional view along line 4B-4B of FIG. 4A, according to an exemplary embodiment of the present invention.

FIG. 2 is a cross sectional view illustrating a closed wrap door and a side door sill, and FIG. 4B is a cross sectional view illustrating a state of when a sealing apparatus of the present invention is installed in an inner surface of a garnish of the wrap door.

Referring to FIG. 2, as described earlier, when adopting the wrap door, it is adopted in a structure wherein the vertical length of the garnish 12 secured to the lower side of the wrap door 10 increases by the decreased left and right width of the side door sill 20, and at the same time the garnish 12 bulges outward, thus becoming bulky.

Since the lower side of the wrap door 10 is adjacent to the rear wheel arch 30 which surrounds the tires, onto the lower side of the rear door 10, muddy water may splash a lot due to centrifugal force generated by the rotation of the tires, so contaminants may permeate inside the vehicle through the gaps between the garnish 12 and the side door sill 20, and the permeated contaminants may contaminate the inner surface of the door and the surface of the side door sill.

In order to improve the above-described problems, the present invention is directed to enhancing the sealing performance of the portions between the garnish 12 installed in the lower side of the rear door 10 and the side door sill 20. Unlike the sealing member configured like a cantilever and shaped like a lip in the related art, referring to FIG. 4, a dust sealing member 40 with a closed cross section is attached to an inner surface of the garnish 12.

More specifically, the dust sealing member 40 with a sealing part 42 with a closed cross section configured to fully prevent the permeation of contaminants from the outside is attached to a portion sealably-contacting with the side door sill 20 in the inner surface of the garnish 12 of the rear door 10 adjacent to the rear wheel arch 30 surrounding the tires.

According to a exemplary embodiment of the present invention, the dust sealing member 40 may include a sealing part 42 closely contacting with the side door sill while defining a circular or elliptical closed section, and a fixing plate 44 which is integrally formed in a rear end of the sealing part 42 and comes into integral contact with the inner surface of the garnish 12.

At this time, the fixing plate 44 is adhered to the inner surface of the garnish 12 and serves to stably hold the sealing part 42, and the sealing part 42 transforms to closely contact with the side door sill 20 by pressure generated when the door is closed.

For example, when the sealing part which forms an elliptical shape lengthwise in a vertical direction comes into close contact with the side door sill, the sealing part becomes a closely contacted state while transforming into an elliptical shape lengthwise in the leftward and rightward directions.

Unlike the sealing member of the lip type of the related art, the sealing part 42 of the sealing member 40 of the present invention becomes a closely contacted state while increasing the contact pressure and contact surface with the side door sill 20, thus fully preventing the permeation of the contaminants from the outside.

The sealing part 42 of the sealing member 40 may be transformed while the sealing part 42 is being pushed to the outside of the vehicle body just when the sealing part 42 comes into close contact with the side door sill 20 by the pressure generating when the door is closed. When the sealing part is pushed in an outward direction of the vehicle body, the sealing performance of blocking the permeation of the contaminants may be degraded.

As a device for preventing the transformation phenomenon where the sealing part 42 of the sealing member 40 is pushed in an outward direction of the vehicle body, there is provided a reinforcing member 50 which is configured to support a boundary portion between the sealing part 42 and the fixing plate 44 in the inner surface of the garnish 12.

According to a exemplary embodiment of the present invention, the reinforcing member 50 may include a resting member 54 which is integrally adhered to an inner surface of the garnish 12 at a predetermined distance spaced apart from the sealing member 40, and a reinforcing bracket 52 which is connected between the sealing member 40 and the resting member 54 and is configured to support the sealing part 42 of the sealing member 40 not to be pushed out.

More specifically, the reinforcing bracket 52 is configured in a structure that integrally includes a base plate 52-1 which closely contacts with and is supported by an inner surface of the garnish 12, an inner side support terminal 52-2 which is bent twice from an inner side terminal of the base plate 52-1 and is inserted in a support groove 46 formed in a boundary portion between the sealing part 42 and the fixing plate 44, and an outer side support terminal 52-3 which is bent twice from an outer side terminal of the base plate 52-1 and is inserted in a resting groove 56 formed in an inner surface of the resting member 54.

The reason why the reinforcing bracket 52 is configured in such a structure that includes the inner side support terminal 52-2 and the outer side support terminal 52-3 both bent twice from about the base plate 52-1 is that the sealing part 42 should be continuously supported so that the reinforcing bracket 52 is not transformed even due to impact when the door is closed.

For example, when the reinforcing bracket 52 is configured in a straight line-shaped plate structure, there may be a predetermined transformation wherein the reinforcing bracket is bent by impact when the door is closed. When the reinforcing bracket is transformed in such a way, the sealing part 42 may not be stably supported.

In such a way, when the sealing part 42 of the sealing member 40 comes into close contact with the side door sill 20 by pressure generated when the door is closed, the reinforcing bracket 52 supports a boundary portion between the sealing part 42 and the fixing plate 44, so it is possible to prevent the sealing part 42 from transforming while the sealing part 42 is being pushed in an outward direction of the vehicle body, and the close contact force of the sealing part 42 against the side door sill 20 may be increased thereby.

As a result, as the close contact force between the sealing part 42 and the side door sill 20 increases, the permeation of the contaminants in the inward direction through gaps between the garnish 12 of the rear door 10 and the side door sill 20 may be fully prevented.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:
1. A dust sealing apparatus of a vehicle, comprising:
  a door garnish of a rear door adjacent to a rear wheel arch of the vehicle;
  a dust sealing member directly attached to a portion of the garnish, wherein the dust sealing member is configured to contact with a side door sill facing an inner surface of the door garnish, the dust sealing member including a sealing part contacting with the side door sill when the door is closed and configured to prevent permeation of contaminants between the dust sealing member and the side door sill,
  a reinforcing member which is mounted on the inner surface of the door garnish in order to mount the dust sealing member to the door garnish, the reinforcing member comprising:
    a reinforcing bracket mounted directly to the inner surface of the door garnish; and
    a resting member which is adhered directly to the inner surface of the garnish to support an outer side support terminal of the reinforcing bracket; and
  a resting groove formed in an inner surface of the resting member which receives the outer side support terminal.

2. The apparatus of claim 1, wherein the dust sealing member further comprises:
   the sealing part having an arcuate cross section; and
   a fixing plate which is integral with a rear end terminal of the sealing part and is adhered to the inner surface of the garnish.

3. The apparatus of claim 2, wherein the reinforcing member is configured to support a boundary portion between the sealing part and the fixing plate.

4. The apparatus of claim 3, wherein
   the reinforcing bracket which integrally includes a base plate contacting the inner surface of the garnish, an inner side support terminal which has two bends and is configured to support the boundary portion between the sealing part and the fixing plate, and the outer side support terminal which has at least two bends.

5. The apparatus of claim 4,
   wherein a support groove is formed in the boundary portion between the sealing part and the fixing plate, and
   wherein the inner side support terminal is inserted in the support groove.

6. The apparatus of claim 1, wherein the dust sealing member further comprises:
   the sealing part having an elliptical cross section; and
   a fixing plate which is integral with a rear end terminal of the sealing part and is adhered to the inner surface of the garnish.

* * * * *